(12) United States Patent
Jin

(10) Patent No.: US 7,233,101 B2
(45) Date of Patent: Jun. 19, 2007

(54) SUBSTRATE-SUPPORTED ARRAY HAVING STEERABLE NANOWIRES ELEMENTS USE IN ELECTRON EMITTING DEVICES

(75) Inventor: Sungho Jin, San Diego, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/357,159

(22) Filed: Feb. 3, 2003

(65) Prior Publication Data

US 2004/0150311 A1    Aug. 5, 2004

Related U.S. Application Data

(60) Provisional application No. 60/437,309, filed on Dec. 31, 2002.

(51) Int. Cl.
   *H01J 1/02*    (2006.01)
(52) U.S. Cl. .............. 313/309; 313/310; 313/495; 313/351; 257/492.2; 378/122; 977/742; 977/762; 977/932; 977/939; 977/952
(58) Field of Classification Search ........ 313/495–497, 313/309, 351, 336, 311, 356; 445/49–51
   See application file for complete search history.

(56) References Cited

U.S. PATENT DOCUMENTS

| | | | | |
|---|---|---|---|---|
| 5,126,574 A | * | 6/1992 | Gallagher | ............... 250/492.2 |
| 5,759,078 A | * | 6/1998 | Levine et al. | ............... 445/24 |
| 5,982,095 A | * | 11/1999 | Jin et al. | ............... 313/582 |
| 6,097,138 A | * | 8/2000 | Nakamoto | ............... 313/309 |
| 6,297,592 B1 | * | 10/2001 | Goren et al. | ............... 315/3.5 |
| 6,445,006 B1 | * | 9/2002 | Brandes et al. | ............... 257/76 |
| 6,456,691 B2 | * | 9/2002 | Takahashi et al. | ............... 378/122 |
| 6,465,132 B1 | * | 10/2002 | Jin | ............... 429/231.8 |
| 6,597,090 B1 | * | 7/2003 | Mancevski | ............... 313/309 |
| 6,625,342 B2 | * | 9/2003 | Staple et al. | ............... 385/18 |
| 6,656,339 B2 | * | 12/2003 | Talin et al. | ............... 205/109 |
| 6,791,278 B2 | * | 9/2004 | Russ et al. | ............... 315/169.3 |
| 6,809,465 B2 | * | 10/2004 | Jin | ............... 313/310 |
| 7,012,266 B2 | * | 3/2006 | Jin | ............... 250/492.2 |
| 2002/0113544 A1 | | 8/2002 | Lee et al. | |
| 2002/0125805 A1 | | 9/2002 | Hsu | |
| 2002/0175618 A1 | | 11/2002 | Lee et al. | |

\* cited by examiner

*Primary Examiner*—Mariceli Santiago
(74) *Attorney, Agent, or Firm*—Harness, Dickey & Pierce, P.L.C.

(57) ABSTRACT

In accordance with the inventions, a new configuration of spaced-apart nanostructures is provided as well as a variety of improved articles using the new configuration. Improved articles include microwave amplifiers, field emission displays, plasma displays, electron sources for lithography and compact x-ray sources.

24 Claims, 14 Drawing Sheets

CARBON NANOTUBES (MWNT, SWNT)

SUBSTRATE

FIELD-CONCENTRATING NANOTUBE CONFIGURATION

SUBSTRATE

SUBSTRATE-SUPPORTED ARRAY HAVING STEERABLE NANOWIRES ELEMENTS USE IN ELECTRON EMITTING DEVICES

CROSS REFERENCE TO RELATED APPLICATIONS

This application claims the benefit of United States Provisional Application Ser. No. 60/437,309, filed Dec. 31, 2002 by Sungho Jin, and entitled "Article Comprising Spaced-Apart and Aligned Nanowires and Method For Making the Same", which is incorporated herein by reference.

This application is also related to U.S. application Ser. No. 10/357,004, filed Feb. 3, 2003 by Sungho Jin, and entitled "Method For Fabricating Spaced-Apart Nanostructures", which is incorporated herein by reference.

FIELD OF THE INVENTION

This invention relates to articles comprising spaced-apart nanostructures and to methods for making such articles.

BACKGROUND OF THE INVENTION

Nanostructures, such as nano-islands and nanowires, are important for advanced electronic, magnetic and optical devices because of the unique characteristics of nanoscale structures. The term "nanostructure" as used herein refers to a structure having an extent of less than a micron in at least one of its three dimensions. The term "nanowire" refers to a structure having an extent of less than a micron in at least two of its three dimensions. It is used generically to include both solid nanowires and hollow nanowires (nanotubes). The term "nanoislands" refers to substrate-supported structures having an extent of less than a micron in at least two and preferably in all three dimensions. Small diameter nanowires, such as carbon nanotubes with a diameter on the order of 1–100 nanometers, have received considerable attention in recent years. See Liu et al., *SCIENCE*, Vol. 280, p. 1253 (1998); Ren et al., *SCIENCE, Vol.* 282, p. 1105 (1998); Li et al., *SCIENCE*, Vol. 274, p. 1701 (1996); J. Tans et al., *NATURE, Vol.* 36, p. 474 (1997); Fan et al., *SCIENCE*, Vol. 283, p. 512 (1999); Bower et als., *Applied Physics Letters,* Vol. 77, p. 830 (2000), and *Applied Physics Letters,* Vol. 77, p. 2767 (2000).

Carbon nanotubes exhibit unique atomic arrangements, nano-scale structures, and unusual physical properties such as one-dimensional electrical behavior, quantum conductance, and ballistic transport. Carbon nanotubes are one of the smallest dimensioned nanowire materials with generally high aspect ratio and small diameter, e.g., single-wall nanotubes may be made with diameters of ~1 nm and multi-wall nanotubes with diameters of less than ~50 nm.

High-quality single-walled carbon nanotubes are typically grown as randomly oriented, needle-like or spaghetti-like, tangled nanowires by laser ablation or arc techniques. Chemical vapor deposition (CVD) methods such as used by Ren et al., Fan et al., Li et al., and Bower et al. tend to produce multiwall nanowires attached to a substrate, often with aligned, parallel growth perpendicular to the substrate. As described in these articles, catalytic decomposition of hydrocarbon-containing precursors such as ethylene, methane, or benzene produces carbon nanotubes when the reaction parameters such as temperature, time, precursor concentration, flow rate, are optimized. Nucleation layers such as thin coatings of Ni, Co, or Fe, are often intentionally added to the substrate surface to nucleate a multiplicity of isolated nanowires. Carbon nanotubes can also be nucleated and grown on a substrate without using a metal nucleating layer, e.g., by using a hydrocarbon-containing precursor mixed with a chemical component, such as ferrocene $(C_5H_5)_2$ Fe, which contains one or more catalytic metal atoms. During the chemical vapor decomposition, these metal atoms serve to nucleate nanotubes on substrate surface. See Cheng et al., *CHEM. PHYSICS LETTERS,* Vol. 289, p. 602 (1998), and Andrews et al., *CHEM. PHYSICS LETTERS,* Vol. 303, p. 467 (1999).

Carbon nanotubes are useful for field emission devices such as flat panel field emission displays, microwave amplifiers, and electron beam lithography devices. Conventional field emission cathode materials typically have been made of metal (such as Mo) or semiconductor material (such as Si) with sharp tips of submicron size. However, the control voltage required for emission is relatively high (around 100 V) because of high work functions and insufficiently sharp tips. To significantly enhance local fields and reduce the voltage requirement for emission, it would be advantageous to provide nanoscale cathodes with small diameters and sharp tips.

In field emission devices, unaligned, randomly distributed nanowires are inefficient electron emitters due to the varying distance and hence varying local electric fields between the cathode (emitting nanowire tips) and the gate or anode. In addition, when unaligned nanowires are used for emitters, an applied electric field between anode and cathode bends the nanowires. The degree of bending is dependent on the applied voltage. This bending causes uncontrollable and undesirable changes in the distance between cathode and gate, and hence alters the local field on different nanowires. In some cases, the bending causes outright electrical shorting between the nanowire tips and the gate. Nanowires pre-aligned toward the anode could prevent or reduce the bending problem.

Referring to the drawings, FIGS. 1(*a*) and 1(*b*) schematically illustrate conventional configurations of aligned nanotubes 10 grown on a substrate 11 in a dense "forest-like" configuration (FIG. 1(*a*)) or in spaced-apart "forests" (FIG. 1(*b*)). The present invention is directed to more desirable configurations of more widely spaced-apart individual nanostructures (FIG. 1*c*) or spaced apart small groups of nanostructures (FIG. 1(*d*)). A forest configuration wastes the unique, high-aspect-ratio, field concentrating characteristics of individual nanowires. While the alignment of nanowires is important for many applications, highly oriented nanowires do not alone guarantee efficient field emission. The reason is that the nanowires are so closely spaced that they shield each other from effective field concentration at the ends. It is therefore desirable to provide more widely spaced apart configurations of nanostructures as are schematically illustrated in FIGS. 1(*c*) and 1(*d*).

SUMMARY OF THE INVENTION

In accordance with the inventions, a new configuration of spaced-apart nanostructures is provided as well as a variety of improved articles using the new configuration. Improved articles include microwave amplifiers, field emission displays, plasma displays, electron sources for lithography and compact x-ray sources.

BRIEF DESCRIPTION OF THE DRAWINGS

The nature, advantages and various additional features of the invention will appear more fully upon consideration of the illustrative embodiments now to be described in detail in connection with the accompanying drawings. In the drawings.

It is to be understood that these drawings are for the purposes of illustrating the concepts of the invention and are not to scale.

DETAILED DESCRIPTION OF THE INVENTION

This description is divided into two parts: Part I describes methods for providing the desirable periodically spaced-apart arrays of nanostructures, and Part II describes various types of apparatus improved by the spaced-apart arrays.

I. Provision of Spaced-Apart Nanostructure Arrays

Two convenient and inexpensive processes for generating periodic, spaced-apart nanostructures are described. One is to employ nano shadow masks, preferably magnetically confined, and the other is to use oblique angle shadow mask deposition.

1) Re-Usable Nano Shadow Masks

CVD growth of carbon nanotubes typically require a formation of nanotube nucleating sites, for example, islands of a catalyst metal such as Co, Ni, or Fe. For the growth of aligned multiwall carbon nanotubes via a "base growth mechanism" [see Bower et al cited earlier], there is a strong correlation between the catalyst metal layer thickness and the final nanotube spacing. A thinner catalyst layer (such as a sputter deposited cobalt layer) results in smaller catalyst particle diameter as the layer breaks up into islands during heating to the CVD temperature of ~800° C. The smaller catalyst island size in turn procedures a nanotube configuration of smaller diameters and larger spacings.

Figure 1A:
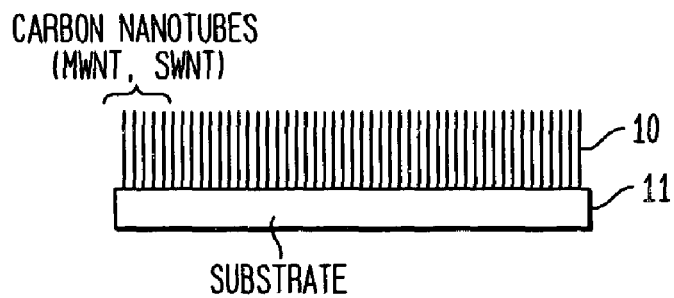
FIG. 1(a)–(d) schematically illustrate various configurations of vertically aligned nanowire structures.
Figure 1B:
Figure 1C:
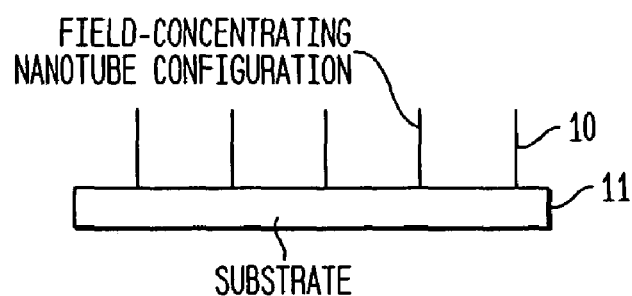
Figure 1D:
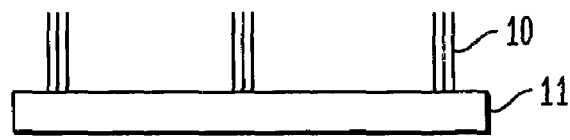
Figure 2:
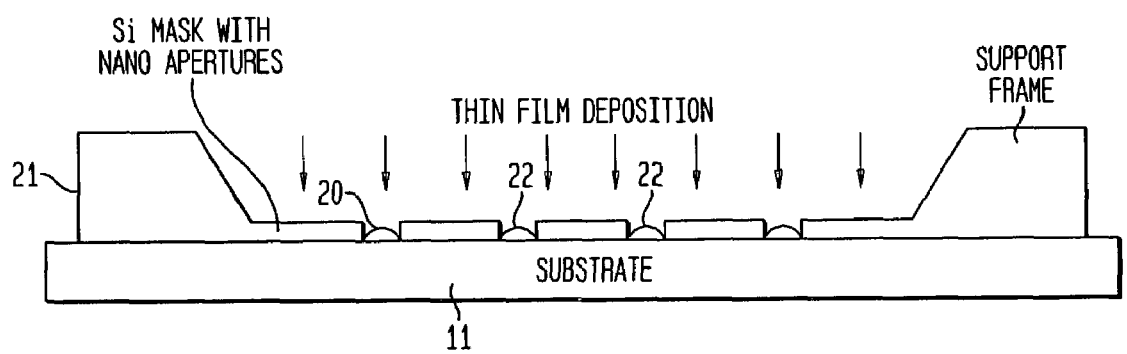
FIG. 2 shows fabrication of periodically spaced-apart nanostructures, such as nucleation sites for nanowire growth, by employing a reusable nano shadow mask.

A convenient, industrially viable, and inexpensive way to provide a spaced-apart array of nano-structures is to prepare a nano shadow mask with a desirable nano pattern (for example, an array of e.g., 1–30 nm circular holes, periodically spaced apart by e.g., 0.05–100 micrometers distance), and to repeatedly use the same shadow mask on many device substrates in order to deposit nano-sized catalyst metal islands. This approach is schematically illustrated in FIG. 2. Metal is deposited through the nano apertures 20 of the shadow mask 21 using thin film deposition techniques such as sputtering or evaporation. The metal is deposited as islands 22.

Figure 3A:
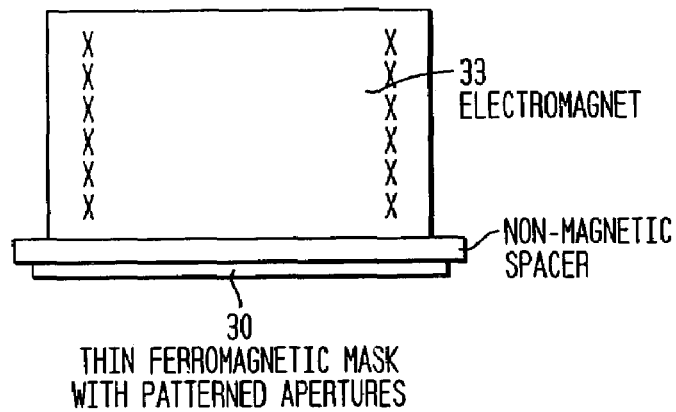
FIGS. 3(a) and 3(b) schematically illustrate an alternative process for obtaining periodically spaced-apart nanostructures by employing a magnetically confined reusable nano shadow mask.
Figure 3B:
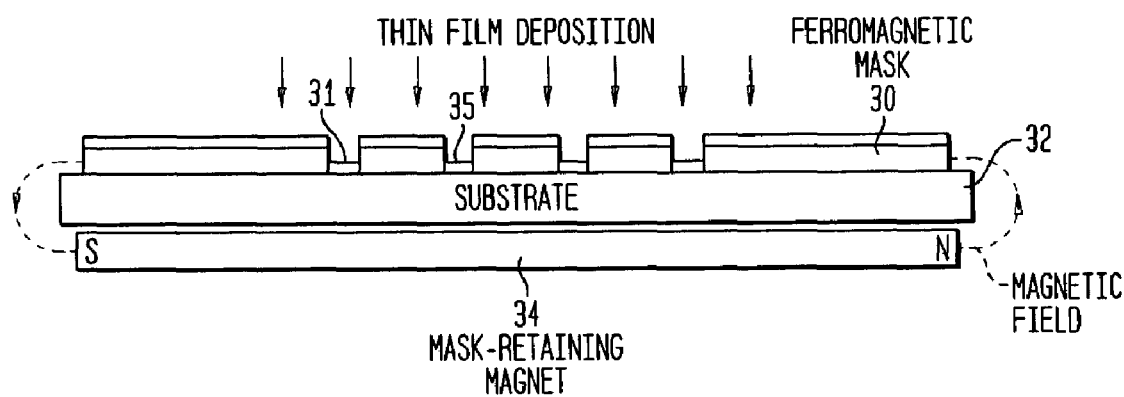

A possible issue with such a simple shadow mask is its fragility. In order to have very small apertures the mask should be thin. For example, to reproducibly deposit nano islands of 10 nm diameter through the shadow mask, the mask thickness should be kept less than ~10 times (and preferably less than 5 times) the aperture diameter. Otherwise the shadow effect during deposition through the apertures may cause complications. Such a mask with a thickness in the 50–100 nm regime is very fragile and prone to breakage unless handled with extreme care. Any slight variation in flatness can easily disrupt the nano pattern. Magnetostatic interactions can be employed to minimize such difficulty. The steps involved are illustrated in FIGS. 3(a) and 3(b).

i) The preparation of a ferromagnetic nano mask 30 (desirably made form Fe, Ni, Co, Ni—Fe alloys, high-strength Fe- or Co-base alloys, or ferrites). The nano-scale patterning of apertures 31 can be accomplished by e.g., electron beam lithography or focused ion beam patterning as the number of such reusable masks does not have to be large.

ii) Transportation of the nano mask to a position over a substrate 32. Care must be taken to minimize the chance of mask breakage. Mechanical grasping is advantageously avoided. Non-mechanical handling, such as magnetic transport, electrostatic transport or vacuum suction transport is preferred. In magnetic transport as illustrated in FIG. 3(a), an electromagnet 33 is slowly magnetized by sending an electrical current to its solenoid, thus gently picking up the ferromagnetic nano shadow mask 30. Slow demagnetization after the transportation to the desired location gently releases the mask from the transporting electromagnet.

iii) Activation of the mask-retaining magnet 34. This can be done either by a magnetization of an electromagnet or by bringing a permanent magnet toward the bottom of the substrate as illustrated in FIG. 3(b). The magnetic field desirably forces the ferromagnetic mask 30 membrane to cling tightly onto the substrate 32 and locks it in place, thus minimizing any warpage-related problems.

iv) Deposition of nano island catalyst 35 through the apertures 31. A nanowire-nucleating catalyst metal (such as 2–5 nm of Fe, Co, or Ni in the case of carbon nanotube growth) can be deposited, for example, by sputtering or evaporation.

v) Removal of the nano shadow mask off the substrate surface can be accomplished by first moving away the mask-retaining magnet, and then using magnetic pick-up and transportation of the nano mask. The nano mask can be used repeatedly until clogging by deposited material, at which time the mask may be cleaned for reuse as by sputtering or chemical etching. An additional advantage of magnetic holding is that the mask can be magnetically held onto a flat, non-etchable surface so that the fragile mask membrane does not break in cleaning acid or washing solution.

vi) CVD nucleation and growth of nanowires from the nano island catalyst regions.

Figure 4:
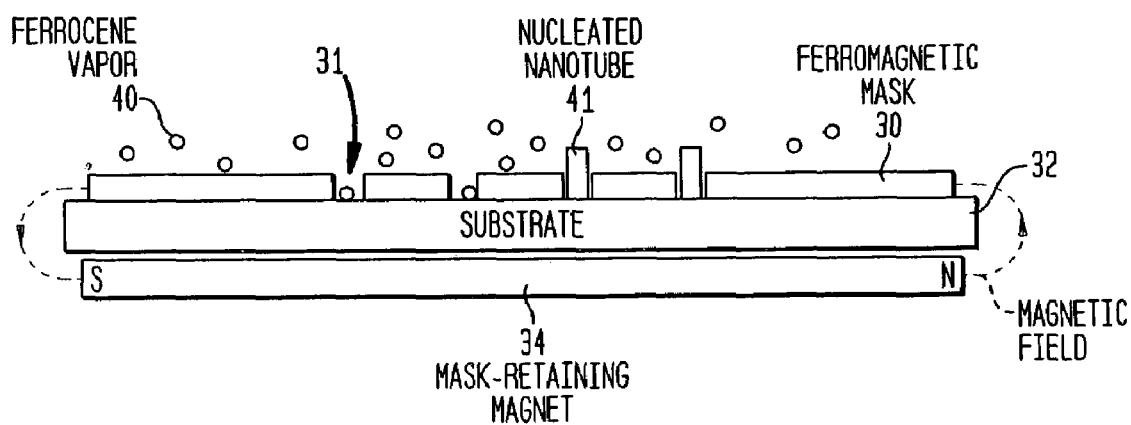
FIG. 4 shows another process for fabricating periodically spaced-apart nanostructures using a vapor nucleating environment.

A variation of the above-described technique is to use the magnetically secured nano shadow mask to selectively allow vapor-phased catalyst to react with the apertured region of the substrate. As discussed earlier, carbon nanotubes can be nucleated and grown on a substrate by using a hydrocarbon-containing precursor mixed with a chemical component which contains one or more catalytic metal atoms. During the chemical vapor decomposition, the metal atoms in vapor 40 nucleate nanotube 41 on the substrate surface. Such an approach is schematically illustrated in FIG. 4. The first two apertures in the figure illustrate the attachment of ferrocene vapor (or droplets) 40 in the apertured region. The other two apertures show the nucleation and growth of carbon nanotubes 41 in each of the apertured regions. After initial nucleation of nanotubes in all the apertures, the ferrocene-containing hydrocarbon gas is replaced with ferrocene-free hydrocarbon gas, the mask is removed, and the CVD reaction is allowed to continue to form nano patterned, spaced apart nanotubes.

Figure 5:
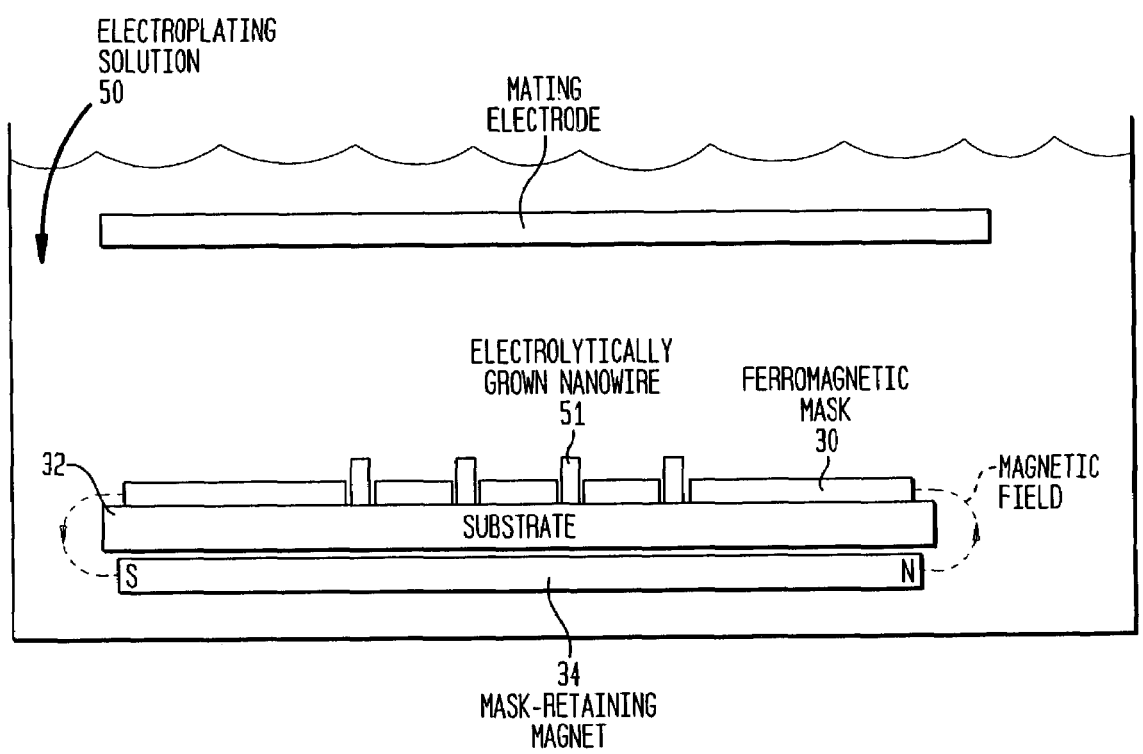
FIG. 5 schematically illustrates another alternative process for obtaining periodically spaced-apart nanostructures using electrolytic deposition.

Yet another useful application of the magnetically secured nano mask is the creation of spaced-apart nanowire array by electrolytic plating, as illustrated in FIG. 5. The nano mask serves to block the access of electrolytic solution 50 to the surface of substrate except for the apertured regions. As a result, nanowires 51 grow out from only the apertured regions of the substrate. The nano mask material may be selected such that it is not easily etchable or platable during the electrolytic deposition process. For example, ferritic stainless steel containing chromium is ferromagnetic but is not easily etchable or plateable. Cobalt-rich alloys are generally less etchable than iron-base alloys. Alternatively, the mask may be made of magnetically soft yet electrically poorly conducting ferrite material such as Ni—Zn-ferrite. The mask surface may also be coated with chromium or oxide material to minimize chemical/electrolytic reactions in the electrolyte. The nanowire growth may be allowed to proceed to the desired length, or alternatively may be stopped at some intermediate stage to remove the mask, and then placed back in the electrolytic solution for further growth.

Figure 6A:
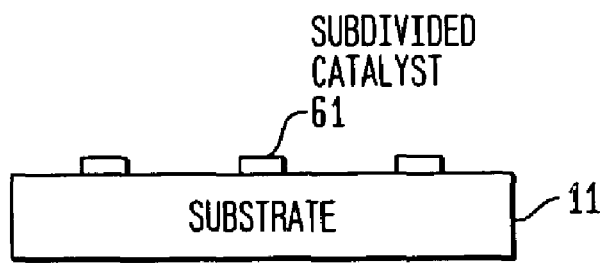
FIGS. 6(a), 6(b), and 6(c) show periodically spaced-apart aligned carbon nanotubes.
Figure 6B:
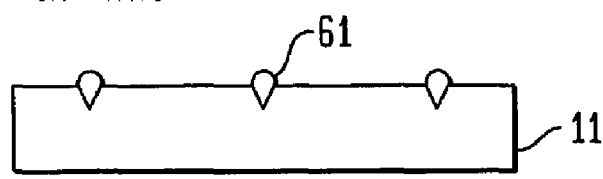
Figure 6C:
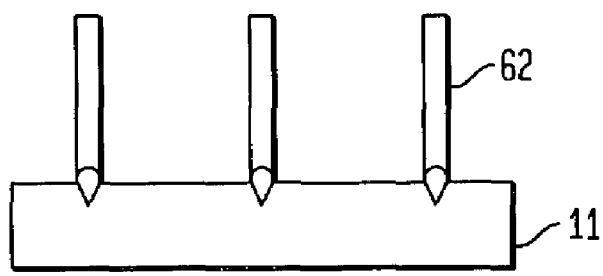

The provision of spaced-apart nano catalyst islands produces nanowires (such as carbon nanotubes) with much smaller diameter and further spaced configuration than an unpatterned or coarse-patterned catalyst, as illustrated in FIGS. 6(a), 6(b), and 6(c). The catalyst islands 61 such as cobalt become essentially spheroidized during heating to the CVD temperature to form particles. These particles react with the substrate (e.g., Si) and form silicide roots for adhesion of nanowires 62 to the silicon substrate. The mask may be left in place or can be removed by physical, magnetic or selective etching means using different chemicals.

2) Oblique Scaled-Down Shadow Mask Deposition

Figure 7A:
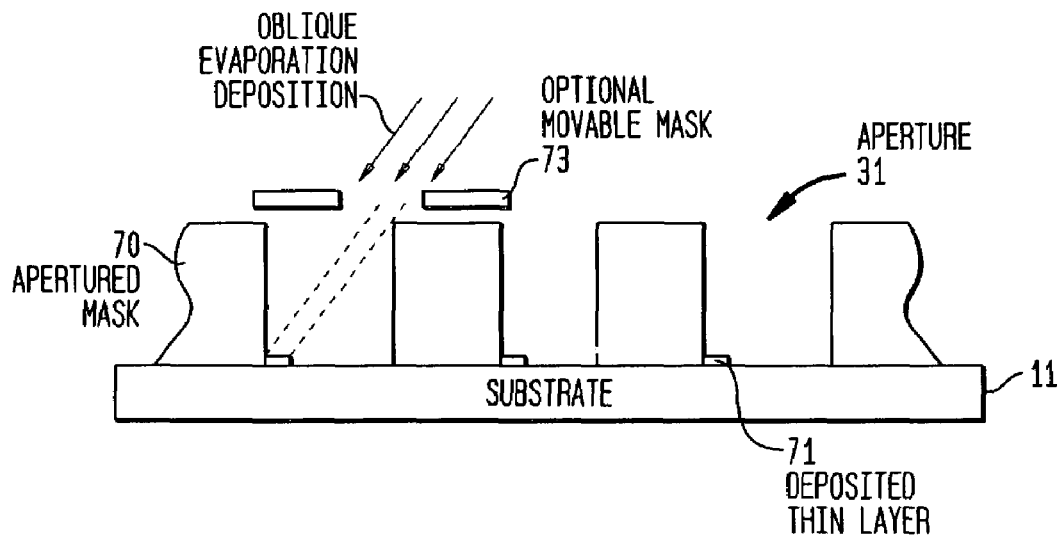
FIGS. 7(a), 7(b), and 7(c) schematically illustrate oblique incident deposition through an apertured shadow mask.
Figure 7B:
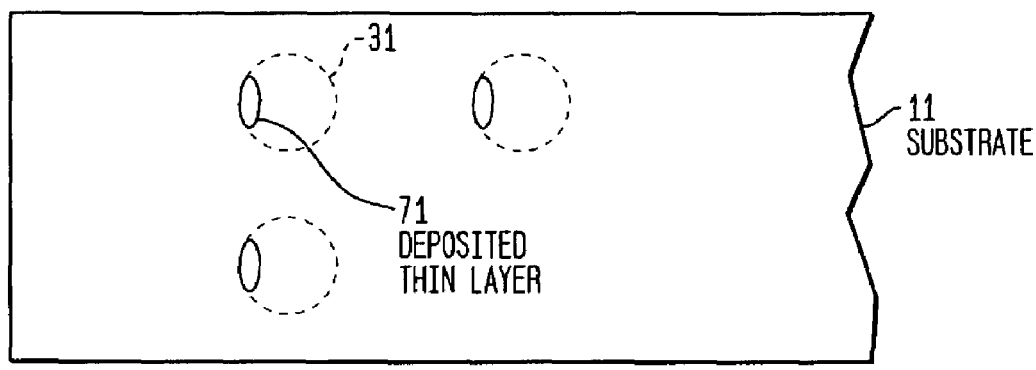
Figure 7C:
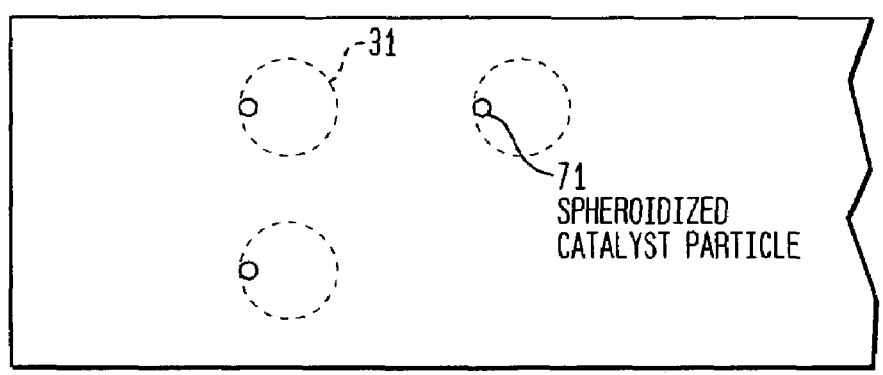

A different approach schematically illustrated in FIGS. 7(a), 7(b), and 7(c) is to use a coarse patterned shadow mask yet create a far smaller nano island 71 than the aperture of the shadow mask. Here oblique incident deposition is utilized over a deep shadow mask, and the shadow effect produces a small island pattern. An optional movable mask 73 can further reduce the size of the islands. An optional movable mask 73 can further reduce the size of the islands. The most important advantage of this approach is minimal expense.

The steps involved in such oblique scale-down shadow mask processing include;

i) The preparation of shadow mask 70 having desirable coarse-patterned apertures.

Transportation of the nano mask a position placed over the substrate 11. Care must be taken to minimize the chance of mask breakage. Non-mechanical handling, such as magnetic transport, electrostatic transport or vacuum suction transport is preferred.

Oblique incident deposition of nano island catalyst through the apertures. A nanowire-nucleating catalyst metal (such as 2–5 nm thick Fe, Co, or Ni film in the case of carbon nanotube growth) is deposited by e.g., sputtering or evaporation.

Removal of the nano shadow mask from the substrate surface (FIG. 7(b)).

CVD nucleation (FIG. 7(c)) and growth of nanowires from the nano island catalyst regions.

FIG. 7(a) shows the principle of oblique incident deposition of catalyst metal to obtain much smaller nano islands than the aperture diameter. The mask height serves to block the major portion of the depositing atom flux so that only a small portion of the incoming flux ends up on the small line-of-sight corner. An optional traveling mask window 73 together with a narrow beam may also be used to achieve consistent island deposition. Evaporation deposition generally gives more accurate line-of-sight deposition than the sputtering. For efficient and meaningful shadowing effect, the desired aspect ratio (height to diameter ratio) for the mask apertures for such oblique deposition is in the range of 0.5–20, preferably 1.0–10, even more preferably 1.5–5.0. The top view of the deposited catalyst layer using the oblique angle shadow mask deposition is schematically illustrated in FIG. 7(b). It is evident that the actual deposited area 71 is much smaller than the aperture area 31. Upon heating of the substrate (e.g., silicon wafer) to the CVD temperature of ~800° C. regime suitable for multiwall carbon nanotube growth, the deposited island layer catalyst metal (e.g., 2 nm thick, 50 nm wide and 200 nm long cobalt film, near-oval shape) spheroidizes into a three dimensional cobalt particle of ~30 nm in diameter (FIG. 7(c)). The particles can be ~500 nm apart. The resultant carbon nanotubes will have a similar space-apart configuration.

Figure 8A:
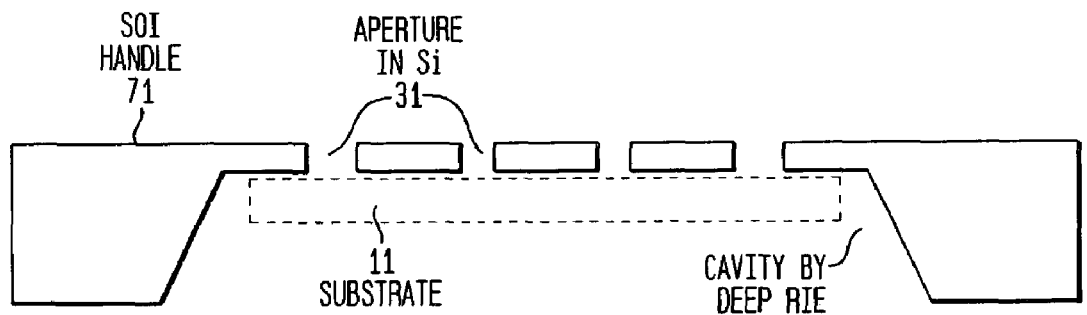
FIGS. 8(a) and (b) illustrate shadow masks for oblique incident deposition of small island nuclei.
Figure 8B:
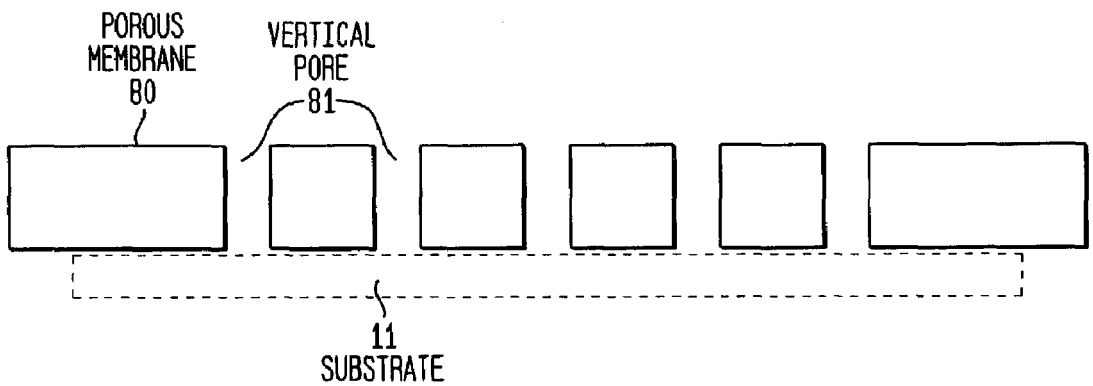

The coarse-scale shadow mask 70 shown in FIG. 8(a) can easily be fabricated using the standard silicon wafer photo lithography process. The mask feature size can be as coarse as ~500 nm diameter for the aperture dimension. Alternatively, as shown in FIG. 8(b)) an anodized aluminum oxide membrane 80 with hexagonally arranged vertical holes or pores 81 with a diameter of 300 nm or smaller, is commercially easily available, and may be used as the shadow mask (FIG. 8(b)).

The CVD growth of carbon nanotubes is optimized e.g., by a microwave plasma-enhanced CVD process using a 2.45 GHz, 5 KW microwave power supply and an inductively heated substrate stage. Acetylene ($C_2H_2$) or other suitable hydrocarbon gas will be used as a base source of carbon in the CVD chamber, together with ammonia ($NH_3$) or hydrogen gas. The vertical alignment of nanotubes in a microwave environment is achieved by virtue of the presence of ac microwave field perpendicular to the substrate surface as described in Bower et al's papers.

II. The Spaced-Apart Nanostructures and Apparatus Using Them

1. The Spaced-Apart Nanostructures

The spaced-apart nanostructures according to the invention can be periodically placed (such as in a square or hexagonal arrangement) or can be randomly arranged depending on the need and design of the pattern shape in the shadow mask used. In general, a periodic arrangement is preferred for the sake of simplicity and predictability of nanostructure behavior. The desired space between neighboring, vertically aligned nanowires in the configuration of 1(c) is such that the nanowire spacing to the nanowire height ratio is at least 0.2, preferably at least 0.5, even more preferably at least 1.0. The desired nanowire or nanotube diameter is typically in the range of 1–500 nm, preferably in the range of 1–50 nm. The desired nanowire height is in the range of 0.1–200 microns, preferably 0.5–50 microns, with an aspect ratio (length-to-diameter ratio) typically in the range of 10–10000. The nanowires can be carbon nanotubes or other types of nanoscale fibers based on metals and alloys, semiconductors (e.g. Si, Ge, GaN, GaAs, ZnO) or ceramics such as carbides, nitrides, borides, or oxides. Electrically insulating nanowires may be additionally coated with conductive materials such as a thin layer of metal if electrical conduction is desired. The nanowires can be simple homogeneous wires, or alternatively, co-axially composite nanowires with different composition materials in a cylindrical layer configuration. They can also be vertically super-latticed, stacked materials with alternating or sequentially varying compositions.

Figure 10:
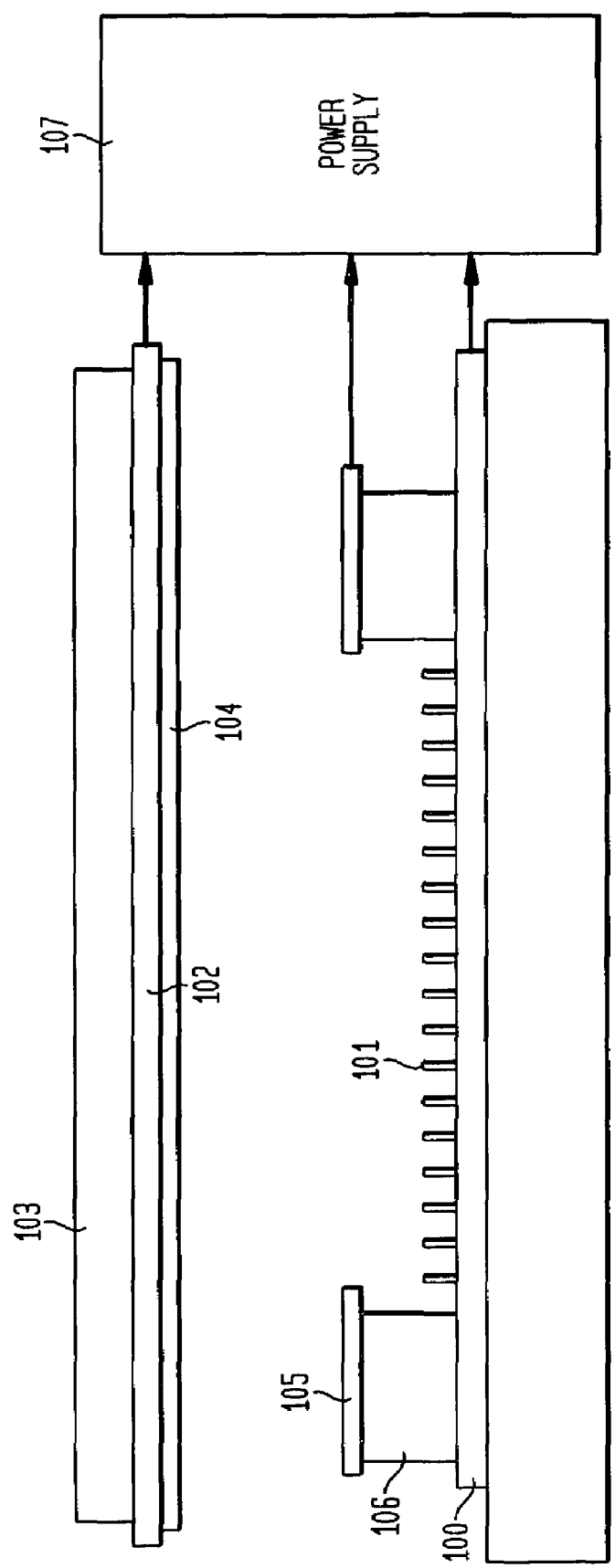
FIG. 10 is a schematic cross-sectional view of an improved field emission device.
Figure 11:
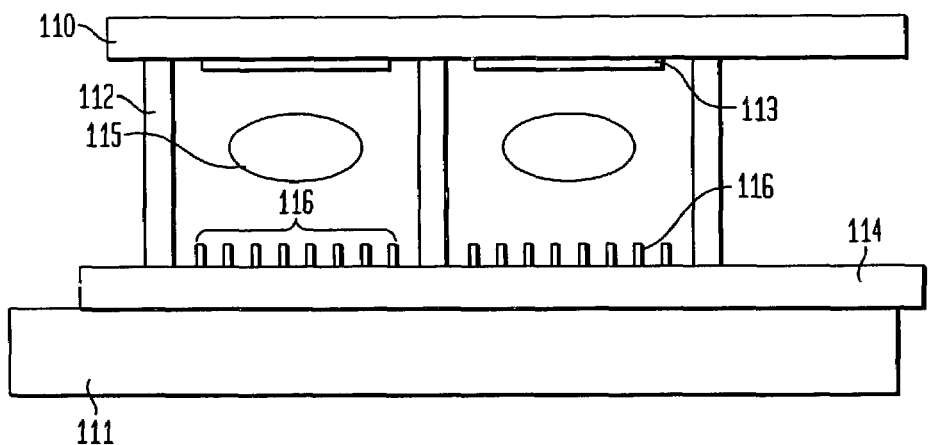
FIG. 11 is a schematic cross-sectional view of an improved plasma-based flat panel display.

The inventive array of periodic and spaced-apart aligned nanowires may advantageously be utilized for various device or processing tool applications. For example, such desirably configured nanowires with significantly enhanced field concentrating capability can be utilized as an improved field emission cathode for microwave amplifier device as illustrated schematically in FIG. 9, for field emission based, flat-panel displays as illustrated in FIG. 10, or plasma based flat-panel displays as illustrated in FIG. 11. Such a nanowire array can also be useful as powerful electron sources for nano fabrication, such as electron beam lithography, especially if they are also structured to have the capability to steer the electron beam as illustrated in FIGS. 12–16. The inventive structure can also be used in high-resolution displays based on steerable electron sources as illustrated in FIG. 17, and in a high-resolution x-ray source array as shown FIG. 18. The spaced-apart nanowires can also be utilized as a nano electrode array to create localized electrolytically deposited nano island arrays or to enable localized electrochemical etching to produce nano cavity array formation as illustrated in FIG. 19.

These applications are described in greater details as follows.

2. Microwave Amplifiers

Carbon nanotubes are attractive as field emitters because their unique high aspect ratio (>1,000), one-dimensional structure and their small tip radii of curvature (~10 nm) tend to effectively concentrate the electric field. In addition, the atomic arrangement in a nanotube structure imparts superior mechanical strength and chemical stability, both of which make nanotube field emitters robust and stable, especially for high current applications such as microwave amplifier tubes. Microwave amplifier tubes are essential components of many modern microwave systems including telecommunications, radar, electronic warfare and navigation systems. While semiconductor microwave amplifiers are available, they generally lack the power capabilities required by most microwave systems. Microwave vacuum tube amplifiers, in contrast, can provide higher microwave power by orders of magnitude. The higher power levels of vacuum tube devices are the result of the fact that electron can travel orders of magnitude faster in a vacuum with much less energy losses than they can travel in a solid semiconductor material. The higher speed of electrons permits the use of the larger structure with the same transit time. A larger structure, in turn, permits a greater power output, often required for efficient operations.

Microwave tube devices typically operate by introducing a beam of electrons into a region where it will interact with an input signal and deriving an output signal from the thus-modulated beam. See A. W. Scott, *Understanding Microwaves,* Ch 12, page 282, John Wiley and Sons, Inc., 1993, and A. S. Gilmour, Jr., *Microwave Tubes,* Artech House, Norwood, Mass., 1986. Microwave tube devices include gridded tubes, klystrons, traveling wave tubes or crossed-field amplifiers and gyrotrons. All of these require a source of emitted electrons.

Traditional thermionic emission cathode, e.g., tungsten cathodes, may be coated with barium or barium oxide, or mixed with thorium oxide, are heated to a temperature around 1000° C. to produce a sufficient thermionic electron emission current on the order of amperes per square centimeter. The necessity of heating thermionic cathodes to such high temperatures causes a number of problems: it limits their lifetime, introduces warm-up delays and requires bulky auxilliary equipment. Limited lifetime is a consequence of the high operating temperature that causes key constituents of the cathode, such as barium or barium oxide, to evaporate from the hot surface. When the barium is depleted, the cathode (and hence the tube) can no longer function. Many thermionic vacuum tubes, for example, have operating lives of less than a year. The second disadvantage is the delay in emission from the thermionic cathodes due to the time required for temperature ramp-up. Delays up to 4 minutes have been experienced, even after the cathode reaches its desired temperature. This length of delays is unacceptable in fast-warm-up applications such as some military sensing and commanding devices. The third disadvantage is that the high temperature operation requires a peripheral cooling system such as a fan, increasing the overall size of the device or the system in which it is deployed. The fourth disadvantage is that the high temperature environment near the grid electrode is such that the thermally induced geometrical/dimensional instability (e.g., due to the thermal expansion mismatch or structural sagging and resultant cathode-grid gap change) does not allow a convenient and direct modulation of signals by the grid voltage alterations. These problems can be resolved or minimized if a reliable cold cathode can be incorporated. Accordingly, there is a need for an improved cold-cathode based electron source for microwave tube devices which does not require high temperature heating. Such cold cathode type microwave amplifier device was disclosed by Goren, et al. in U.S. Pat. No. 6,297,592, "Microwave vacuum tube device employing grid-modulated cold cathode source having nanotube emitters", issued on Oct. 2, 2001. Sources using these carbon nanotubes provide electrons for microwave vacuum tubes at low voltage, low operating temperature and with fast-turn-on characteristics.

Figure 9:
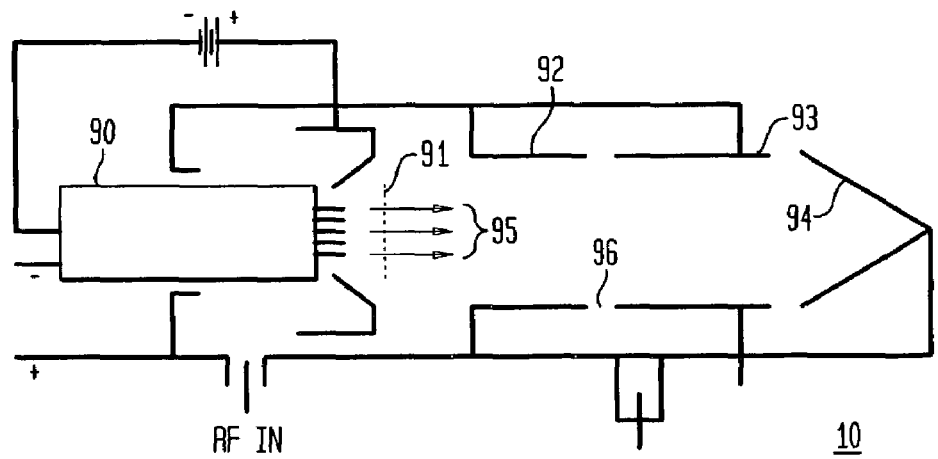
FIG. 9 schematically illustrates an improved microwave amplifier.

Referring to the drawings, FIG. 9 is a schematic cross-sectional illustration of an exemplary inventive microwave vacuum tube comprising spaced-apart nanowire cold cathode, which is basically of "klystrode" type. The klystrode structure is of gridded tube type (other types of gridded tubes include triodes and tetrodes). The inventive device contains 5 main elements—a cathode 90, a grid 91, an anode 92, a tail pipe 93, and a collector 94. The whole tube is optionally placed in a uniform magnetic field for beam control. In operation, a RF voltage is applied between the cathode 90 and grid 91 by one of several possible circuit arrangements. For example, it is possible for the cathode to be capacitively coupled to the grid or inductively coupled with a coupling loop into an RF cavity containing the grid structure. The grid 91 regulates the potential profile in the region adjacent the cathode, and is thereby able to control the emission from the cathode.

The resulting density-modulated (bunched) electron beam 95 is accelerated toward the apertured anode 92 at a high potential. The beam 95 passes by a gap 96, called the output gap, in the resonant RF cavity and induces an oscillating voltage and current in the cavity. RF power is coupled from the cavity by an appropriate technique, such as inserting a coupling loop into the RF field within the cavity. Finally, most of the beam passes through the tail pipe 93 into the collector 94. By depressing the potential of the collector 94, some of the dc beam power can be recovered to enhance the efficiency of the device.

The inventive, improved klystrode structure is a very efficient device because it combines the advantages of the resonant circuit technologies of the high frequency, velocity-modulated microwave tubes (such as klystrons, traveling wave tubes and crossed-field tubes) and those of the grid-modulation technologies of triodes and tetrodes, together with the unique, cold cathode operation using high-current emission capabilities of nanowire field emitters. The inventive cold cathode allows the grid to be positioned very close to the cathode, for direct modulation of the electron beam signals with substantially reduced transit time.

Since efficient electron emission is typically achieved by the presence of a gate electrode in close proximity to the cathode (placed about 1–100 µm distance away), it is desirable to have a fine-scale, micron-sized gate structure with as many gate apertures as possible for maximum emission efficiency and minimize the heating effect caused by electrons intercepted by the gate grids. The grid in the inventive, cold cathode type, vacuum tube device is made of conductive metals, and has a perforated, mesh-screen or apertured structure so as to draw the emitted electrons yet let the electrons pass through through the apertures and move on to the anode. The apertured grid structure can be prepared by photolithographic or other known patterning technique, as is commercially available. The desired average size of the aperture is in the range of 0.5–500 µm, preferably 1–100 µm, even more preferably 1–20 µm. The grid structure in the present invention can also be in the form of a fine wire mesh screen, typically with a wire diameter of 5–50 µm and wire-to-wire spacing (or aperture size) of 10–500 µm. The aperture shape can be either circular, square or irregular.

Within each aperture area, a multiplicity of optimally spaced-apart nanotube emitters attached on the cathode surface emit electrons when a field is applied between the cathode and the grid. A more positive voltage is applied to the anode in order to accelerate and impart a relatively high energy to the emitted electrons. The grid is a conductive element placed between the electron emitting cathode and the anode. It is separated from the cathode but is kept sufficiently close in order to induce the emission.

The grid can be separated from the cathode either in a suspended configuration or with an electrically insulating spacer layer such as aluminum oxide. The dimensional stability of the grid, especially the gap distance between the cathode and the grid, is important, for example, in the case of unavoidable temperature rise caused by electron bombardment on the grid and resultant change in dimension and sometimes geometrical distortion. It is desirable that the grid be made with a mechanically strong, high melting point, low thermal expansion metal such as a refractory or transition metal. The use of mechanical strong and creep-resistant ceramic materials such as highly conductive oxides, nitrides, or carbides is also possible. The grid is desirably configured to have as much mechanical rigidity as possible.

Field Emission Displays

The spaced-apart and aligned nanowire-based emitters described herein can also be utilized to make unique, flat-panel, field emission displays, such as schematically illustrated in FIG. 10. Here, the "flat-panel displays" is arbitrarily defined as meaning "thin displays" with a thickness of e.g., less than ~10 cm. Field emission displays can be constructed with either a diode design (i.e., cathode-anode configuration) or a triode design (i.e., cathode-grid-anode configuration). The use of grid electrode is preferred as the field emission becomes more efficient. Advantageously this electrode is a high density aperture gate structure place in proximity to the spaced-apart nanowire emitter cathode to excite emission. Such a high density gate aperture structure can be obtained e.g., by lithographic patterning.

For display applications, emitter material (the cold cathode) in each pixel of the display desirably consists of multiple emitters for the purpose, among others, of averaging out the emission characteristics and ensuring uniformity in display quality. Because of the nanoscopic nature of the nanowires such as carbon nanotubes, the emitter provides many emitting points, but because of field concentration desired, the density of nanotubes in the inventive device is restricted to less than $100/(\mu m)^2$. Since efficient electron emission at low applied voltage is typically achieved by the presence of accelerating gate electrode in close proximity (typically about 1 µm distance), it is useful to have multiple gate aperture over a given emitter area to maximally utilize the capability of multiple emitters. It is also desirable to have fine-scale, micron-sized structure with as many gate apertures as possible for maximum emission efficiency.

The exemplary field emission display in FIG. 10, comprises a substrate 100 which also serves as the conductive cathode, a plurality of spaced-apart and aligned nanotube emitters 101 attached on the conductive substrate, and an anode 102 disposed in spaced relation from the emitters within a vacuum seal. The transparent anode conductor formed on a transparent insulating substrate 103 (such as a glass) is provided with a phosphor layer 104 and mounted on support pillars (not shown). Between the cathode and the anode and closely spaced from the emitters is a perforated conductive gate layer 105. Conveniently, the gate 105 is spaced from the cathode 100 by a thin insulating layer 106.

The space between the anode and the emitter is sealed and evacuated, and voltage is applied by power supply 107. The field-emitted electrons from nanotube emitters 101 are accelerated by the gate electrode 105, and move toward the anode conductive layer 102 (typically a transparent conductor such as indium-tin-oxide) coated on the anode substrate 103. Phosphor layer 104 is disposed between the electron emitters and the anode. As the accelerated electrons hit the phosphor, a display image is generated.

4. Plasma Displays

The spaced-apart and aligned nanowire structure described herein is also useful in improving the performance and reliability of flat panel plasma displays. Plasma displays utilize emissions from regions of low pressure gas plasma to provide electrodes within a visible display elements. A typical display cell comprises a pair of sealed cell containing a noble gas. When a sufficient voltage is applied between the electrodes, the gas ionizes, forms a plasma, and emits visible and ultraviolet light. Visible emissions from the plasma can be seen directly. Ultraviolet emissions can be used to excite visible light from phosphors. An addressable array of such display cells forms a plasma display panel. Typically display cells are fabricated in an array defined by two mating sets of orthogonal electrodes deposited on two respective glass substrates. The region between the substrates is filled with a noble gas, such as neon, and sealed.

Plasma displays have found widespread applications ranging in size from small numeric indicators to large graphics dismays. Plasma displays are strong contenders for future flat panel displays for home entertainment, workstation displays and HDTV displays. The advantage of using a low work function material to lower the operating voltage is described in U.S. Pat. No. 5,982,095 by Jin et al., "Plasma displays having electrodes of low-electron affinity materials", issued on Nov. 9, 1999, which is incorporated herein by reference. The nanowire arrays according to the invention can provide improved plasma displays as the efficient electron emission from the spaced-apart and aligned nanowires allow the operation of plasma displays at reduced operating voltages, higher resolution, and enhanced robustness.

Referring to the drawings, FIG. 11 schematically illustrates an improved display cell in accordance with the invention. The cell comprises a pair of glass plates 110 and 111 separated by barrier ribs 112. One plate 110 includes a transparent anode 113. The other plate 111 includes a cathode 114. The plates 110, 111 are typically soda lime glass. The anode 113 is typically a metal mesh or an indium-tin-oxide (ITO) coating. The cathode 113 is either metal such as Ni, W and stainless steel or a conductive oxide. A noble gas such as neon, argon or xenon (or mixtures thereof) is filled in the space between the electrodes. The barrier ribs 112 are dielectric, and typically they separate plates 110, 111 by about 200 micrometers. In operation, a voltage from a power supply (not shown) is applied across the electrodes. When the applied voltage is sufficiently high, a plasma 115 forms and emits visible and ultraviolet light. The presence of the inventive nanowire structure 116 will allow the plasma 115 to be generated at lower voltages because electron emission from the nanowire under electrical field or upon collision with ions, metastables and photons is much easier than with conventional materials. This facilitated emission greatly reduces the power consumption, simplifies the driver circuitry, and permits higher resolution.

5. Electron Source Array for Nano Fabrication

Nano fabrication technologies are crucial for construction of new nano devices and systems as well as for manufacturing of next generation, higher-density semiconductor devices. Conventional e-beam lithography with its single-line writing characteristics is inherently slow and costly. Projection e-beam lithography technology, which is sometimes called as SCALPEL, is disclosed in U.S. Pat. Nos. 5,701,014 and 5,079,112 by Berger, et al., and U.S. Pat. No. 5,532,496 by Gaston. The projection e-beam lithography may be able to handle ~1 cm$^2$ exposure with the exposure time of <1 second, but this is too slow for satisfactory throughput in manufacturing. The technique also requires the use of special stencil masks and still has a relatively poor resolution of several tens of nanometers. It would therefore be desirable if one can develop a new, two-dimensional type, e-beam nano lithography technique which can pattern a much wider area simultaneously with significantly higher throughput approaching those for current photolithography processes, and which can generate any programmed, high-resolution image without special masks. Such a new fabrication technology can provide electronics technology with finer feature sizes leading to higher device/circuit density and reduced size.

To accomplish such a two-dimensional e-beam lithography, a parallel beam writing has to take place simultaneously at many different locations on the surface of the object to be nano patterned. In theory, a two-dimensional, x-y addressable array of electron field emission sources (for example, as in the Spindt tip cold cathode array described in an article by C. A. Spindt, C. E. Holland, A. Rosengreen, and I. Brodie, "Field emitter array development for high frequency operation," *J. Vac. Sci. Technol. B*, vol. 11, pp. 468–473, 1993, or nanotube field emission display cathodes described by W. B. Choi, et al., "Carbon-Nanotube Based Field-Emission Displays for Large Area and Color Applications", Journal of Information Display, Vol. 1, No. 1, p. 59, December 2000 may be used to achieve simultaneous e-beam writing. However, it would be impractical to try to make the size scale of each cold cathode cell structure to be on the order of ~10 nanometers, the resolution of the current e-beam lithography. Even if such a nanoscale cathode structure can be fabricated, the number of cathode cells and associated lead wires required for x-y addressing would be astronomical. To carry out two-dimensional e-beam lithography on a 12 inch diameter wafer, for example, it would take ~$10^{14}$ cathodes and wire connections.

In the present invention, in order to bring up the cathode cell size to a more practical range while maintaining a very fine resolution (e.g., ~10 nm scale) in the two-dimensional e-beam writing, MEMS technology is incorporated. By combining the MEMS and the nano technology, such a desired goal of creating a new and novel two-dimensional e-beam lithography technology can be accomplished. The inventive lithography apparatus consists of subdivided MEMS cells. A movable MEMS component in each MEMS cell will be electrostatically or magnetically actuated to tilt/rotate three-dimensionally so that the electron trajectory from a nano field emitter attached onto it (e.g., nanowire or nanotube cold cathode) can be scanned over the entire cell area, e.g., 10 micrometer diameter of square area. The device contains an array of MEMS cells, each containing a movable and scannable component with a single electron field emitter. The object to be e-beam lithographed, such as a thin coating of resist material, e.g., PMMA (poly methylmethacrylate) is, after exposure to the e-beam irradiation, chemically etch processed to develop a nano-scale patterned structure. Alternatively, instead of using the resist material, the scanning e-beams may be allowed to directly bombard thin metal or ceramic films so that melting and ablation removal (evaporation) of the material occurs to generate a trench or hole type nano patterned structure.

Figure 12:
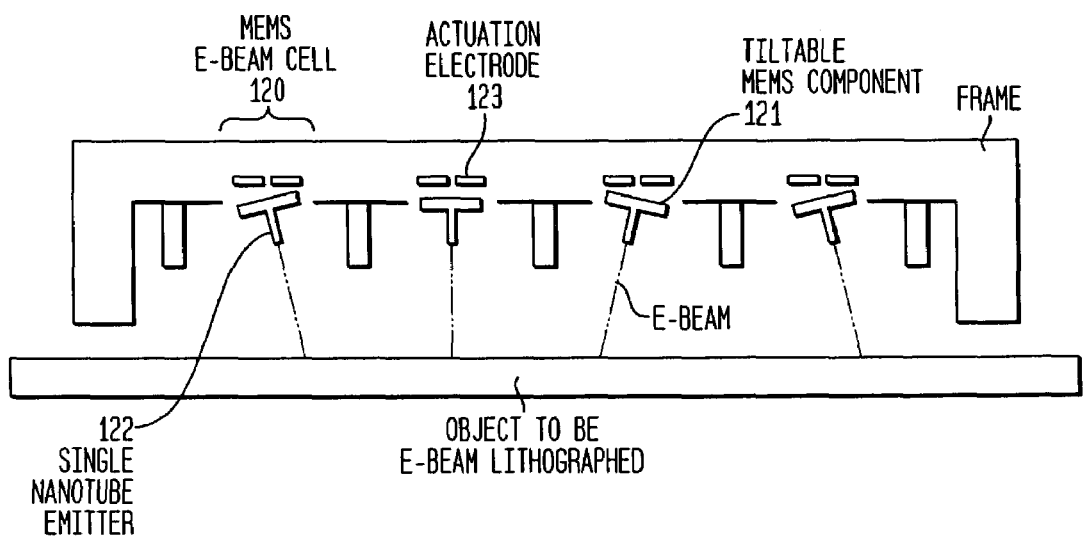
FIG. 12 schematically shows novel arrays of MEMS steerable electron sources.

FIG. 12 shows an exemplary two-dimensional e-beam lithography device comprises an array of MEMS cells 120, and each of the MEMS cells contains a movable disk 121 of any shape (circular, square, triangular, etc.). The tilting of the movable disk in each cell and hence the trajectory of field emitted electrons from the nano emitter 122 attached on the movable disk is controlled to any desired angle by applying a varying intensity of electric fields to least 3 electrodes 123 located above the disk. Such a tilting technology for MEMS movable component has been established in recent years. See U.S. Pat. No. 6,201,631 by Greywall (Mar. 13, 2001), U.S. Pat. No. 6,028,689 by Michalicek et al. (Feb. 22, 2000), and U.S. Pat. No. 5,629,790 by Neukermans et al. (Mar. 13, 1997). The MEMS structure illustrated in FIG. 12 can be fabricated by using either surface micro-machining such as MUMPS (Multi User MEMS Processing System) process, bulk micro-machining such as employing SOI (silicon-on-insulator) based process, or LIGA process (based on x-ray lithography and electrodeposition). Such MEMS fabrication processes are described in detail in the literature, for example, see the book entitled "Fundamentals of Microfabrication" by Marc Madou, CRC Press, New York 1997, and the book entitled "Micromachined Transducers—Source Book" by Gregory T. A. Kovacs, McGraw Hill, New York 1998. The MEMS structure can be made of a number of alternative materials including poly-silicon, single crystal silicon, silicon carbide, diamond or metal.

On each movable disk 121, a single electron field emitter 122 (or optionally a few redundant spare nanowires) is vertically placed as a source of scanning e-beam. The field emitter is preferably a carbon nanotube, but the use of other types of nanowires based on non-carbon materials, a material with sharp tips such as patterned silicon tips, or a combination of these materials is not excluded. Carbon nanotubes grown on silicon pyramid tips (such as described in U.S. Pat. No. 6,401,526 by Dai et al. (Jun. 11, 2002) may also be used as emitters for this invention. To maintain high resolution with a minimal waste of real estate space on the device surface, the spaced-apart nanowires for the 2-dimensional e-beam lithography device are preferably grown directly on the surface of the moving disk. It is known that a single nanotube is capable of providing a large emission current density as high as $\sim 10^8$ A/cm$^2$.

An exemplary tiltable disk structure suitable for the inventive device can be either a spring-configuration or a double-gimbal configuration. Other types of tilt/rotate designs such as using torsional bars can also be used. The movable disk, and hence the pointing direction of the nanotube emitter attached on it, can be tilted toward any direction by independent control of the electrostatic potentials applied between the movable disk and each of the electrodes. Alternatively, instead of electrostatic actuation to tilt the movable disk, a magnetic actuation can also be used by adding (or thin film depositing) a magnetic layer material on the movable disks. Instead of applying a potential (voltage) onto the electrodes, an electrical current will be applied to solenoids or thin/thick film coils to induce magnetic attraction or repulsion force on the movable component. Other types of MEMS actuation may also be utilized, for example, piezoelectric or thermal actuation.

Figure 13A:
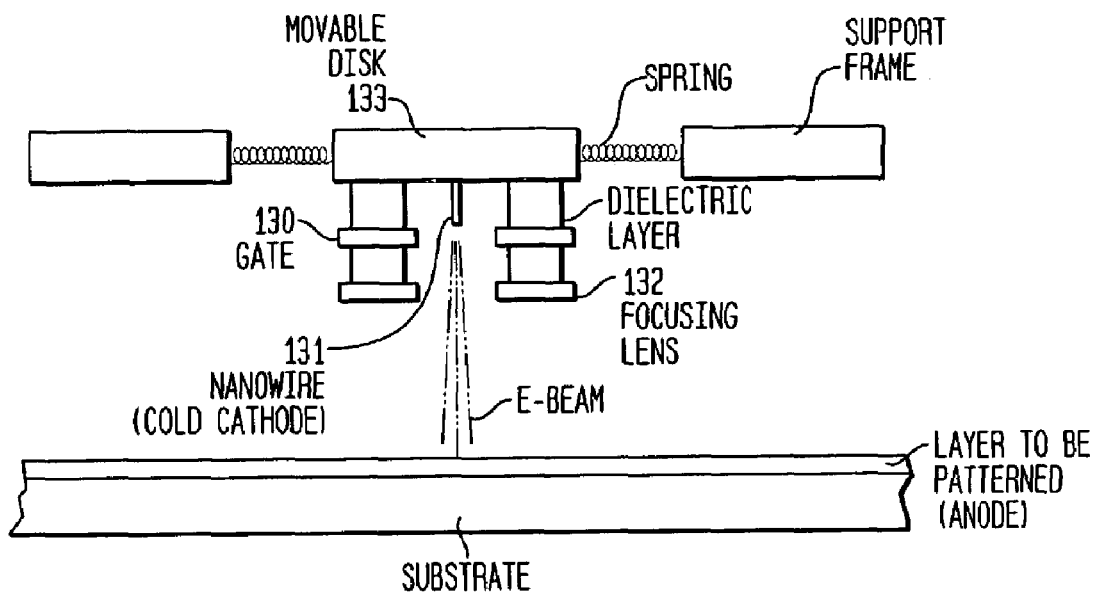
FIGS. 13(a) and 13(b) illustrate electron beam focusing electrodes for the steerable electron source of FIG. 12.
Figure 13B:
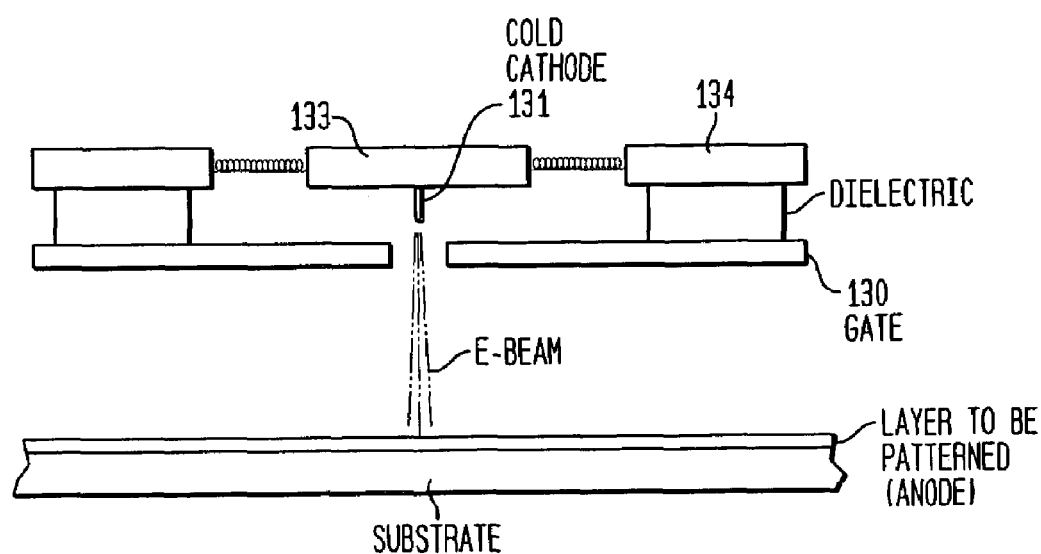

While a simple diode structure consisting of a cathode (e.g., the nanotube field emitter) and an anode (the object to be e-beam lithographed) can be adapted, a triode structure provides an easier control of electron emission by the presence of gate electrode near the cathode. FIGS. 13(a) and 13(b) show such triode structures. A gate 130 placed near the tip of carbon nanotubes 131 for ease of extracting the electrons, may also be combined with additional electrode layers 132 stacked to serve as optical lenses for e-beam focusing if needed. Either electrostatic or magnetic focusing may be utilized. In FIG. 13(a), the gate 130 and the focusing lens 132 are fabricated directly on each movable disk 133. An alternative structure is to attach the gate 130 on the support frame 134 as illustrated in FIG. 13(b). The latter apparatus would be useful if the angle range of the intended scanning is relatively small, e.g., less than ~10 degrees away from the vertical center line.

Figure 14:
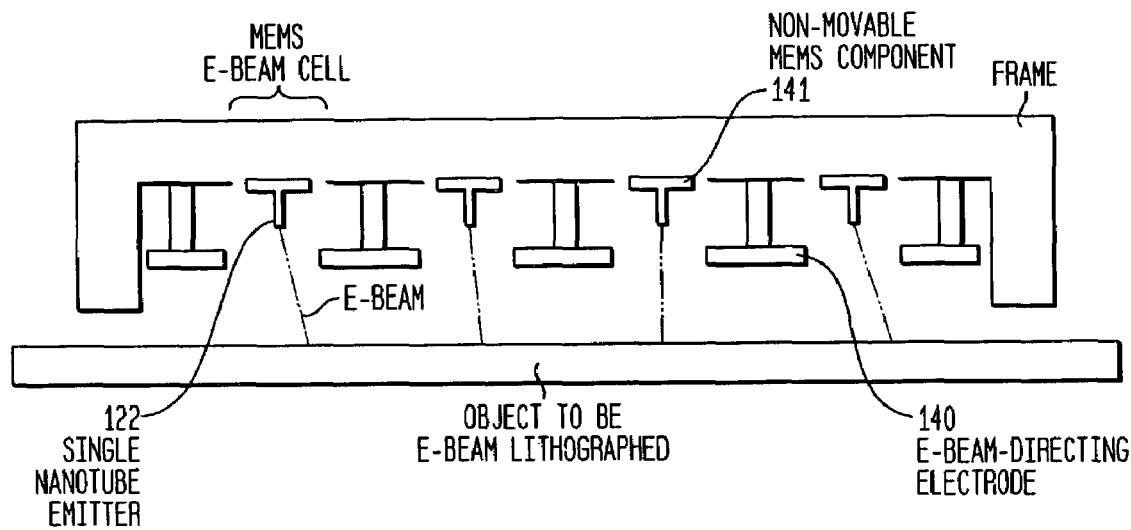
FIG. 14 is a schematic diagram of a two dimensional array of electrostatically steerable electron sources comprising the periodically spaced-apart carbon nanotubes.
Figure 15:
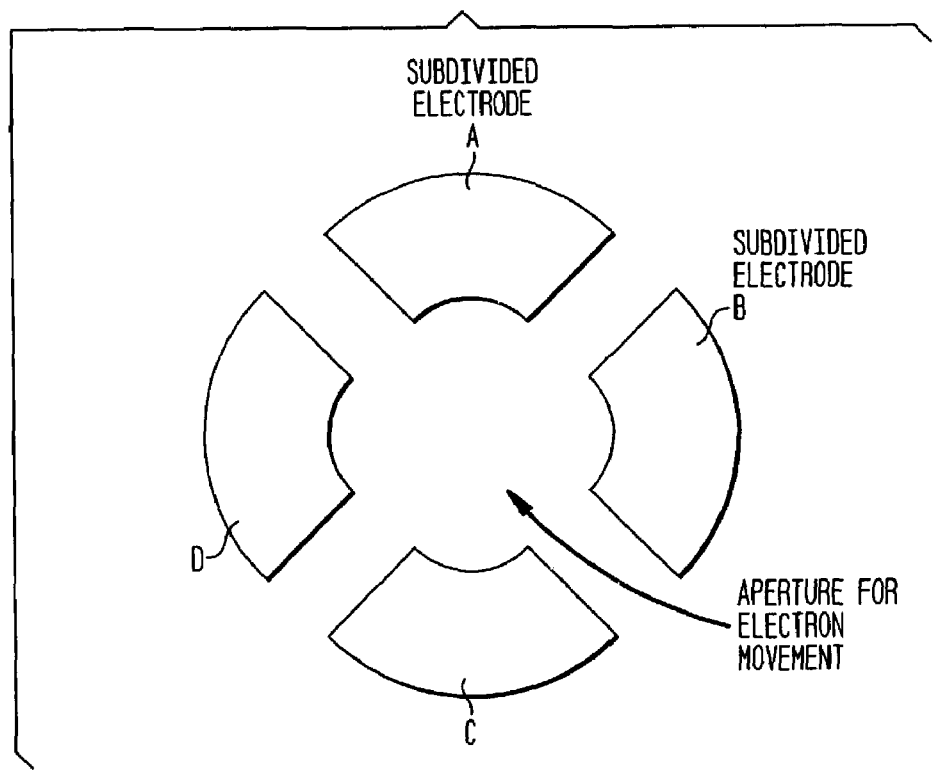
FIG. 15 illustrates control electrodes for steering of electron beam in the device of FIG. 14.

A different approach of scanning the e-beam using electronic controls only, without any moving parts, can also be employed for the inventive 2-dimensional lithography device, as illustrated in FIG. 14. In this alternative embodiment, the gate or focusing lens 140 can be used as a means of altering the beam direction. The emitter support 141 can be stationary by subdividing the gate or focusing lens electrode 140, e.g., as independently controllable segments A, B, C, D as illustrated in FIG. 15, and applying asymmetric potentials among the sub-electrodes, the e-beam can be made to project toward any selected directions. The electrons tend to move toward the electrode segment with higher applied voltage. The advantage in this approach is that the electrostatically actuated MEMS moving components and long-term reliability complications associated with the presence of moving parts can be eliminated altogether.

As a field emitter, the use of a single (or at most 5) nanotube for each cell is preferred to a multiplicity of nanotubes as the problem of beam spread and perpendicular momentum is minimized. A multiple nanotube per unit cell configuration, while easier to fabricate than the single nanotube configuration, is likely to complicate the electron optics design because the increased spread in energy and perpendicular momentum would make it more difficult to focus the e-beam. The spaced-apart and periodically arranged inventive nanowire configuration fits well with periodically arranged MEMS cells. The spaced apart nanowires or small groups of nanowires can conveniently be grown on the substrate after an array of movable disks have been formed. The nanowires are advantageously spaced to grow in the center of the disks.

The desired size of each MEMS cell in the inventive two-dimensional electron source array is in the range of 1–1000 micrometer in square or circular dimension. The desired density of MEMS cells can be determined based on the needs for high throughput weighed against the complexity of fabricating many small cells. By virtue of simultaneous writing from many electron emitters in the inventive two-dimensional e-beam lithography device, without even requiring special masks (such as those used for projection e-beam lithography), a high throughput in lithography process is possible. The inventive technique can generate any image on the resist layer material via independent control of the MEMS cells.

Instead of using a resist material, the inventive two-dimensional e-beam lithography device can also be used as a direct-writing tool on metal, ceramic or polymer substrate. Because of the two-dimensional, simultaneous write-capability at many beam sites, the speed of information recording by this technique can be very high. With the e-beam energy sufficient to ablate the material, a permanent hole or groove pattern can be recorded so as to create ultra-high-density CD ROM (read-only-memory) disks for storage of data or information. The desired dimension of such recorded memory bit size is in the range of about 10 nm–100 nm, preferably less than 50 nm, even more preferentially less than 20 nm. The reading of the stored information bits so produced may be read with special light beam such as NSOM (Near-Field Scanning Microscopy) or even with the electron beam itself.

Figure 16:
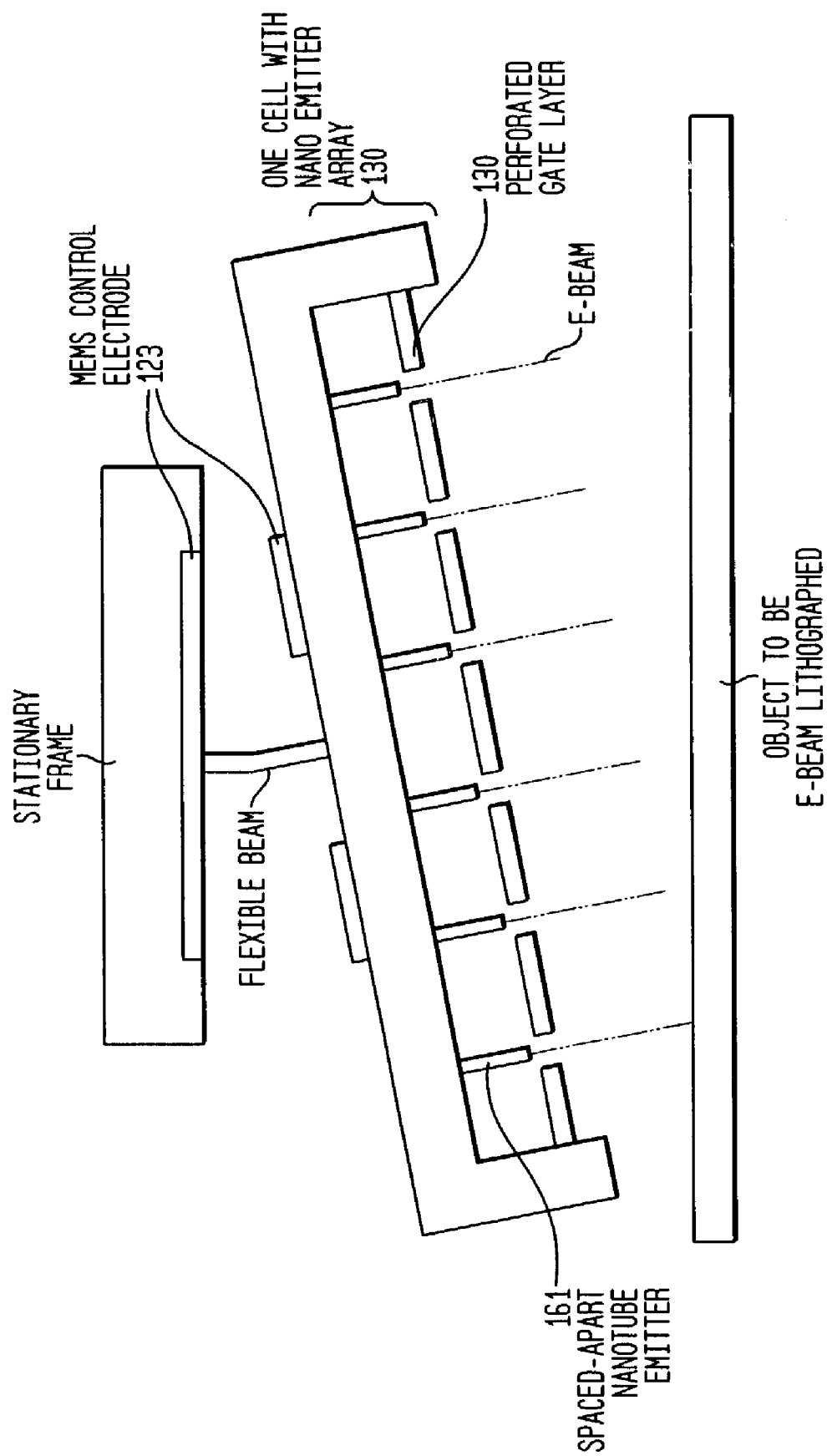
FIG. 16 schematically illustrates another MEMS steerable electron source.

FIG. 16 schematically illustrates another e-beam source array 160 comprising the spaced-apart and aligned nanowires 161 scanned by a MEMS cell 161 as an array of e-beam sources. Such a device configuration is convenient if a broader e-beam rather than a single line, focused e-beam is desired, e.g., for localized projection e-beam lithography.

6. Ultra High Density Displays

Figure 17A:
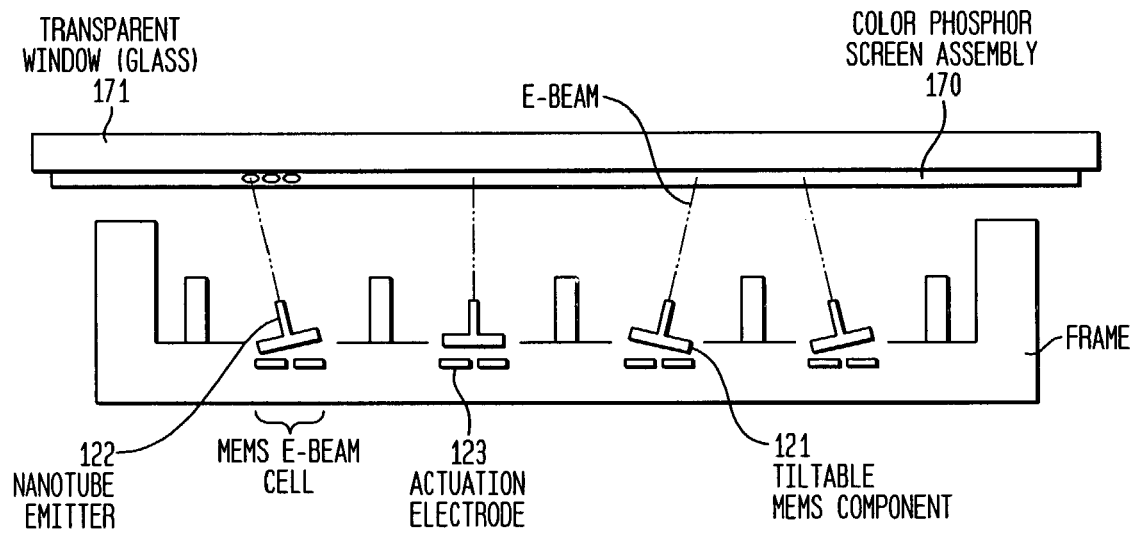
FIGS. 17(a) and (b) schematically illustrate a high-resolution, MEMS based field emission display.
Figure 17B:
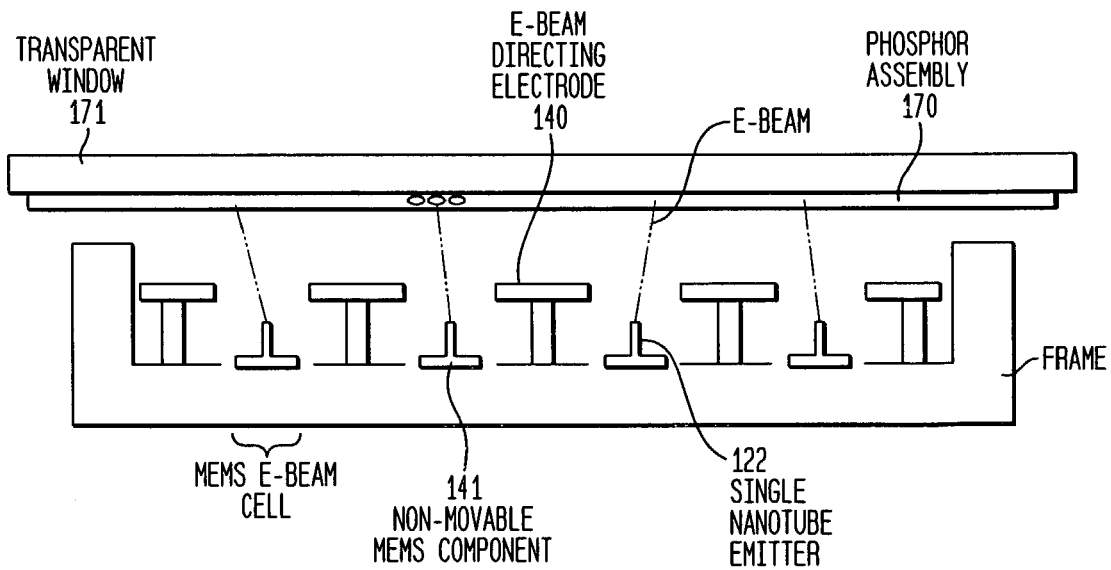

The inventive arrays can also be utilized for design and construction of ultra-high-resolution, flat panel displays such as illustrated in FIGS. 17(a) and 17(b). A phosphor screen assembly 170 with red-green-blue colors and a transparent glass window 171 are added in front of the electron beam. The diameter of an e-beam arriving at the phosphor screen 170 will be of the order of 10–500 nm depending on the distance, a super-sharp, super-high-density-pixel display image with a resolution of better than 1 micrometer, preferably better than 500 nm, even more preferably better than 100 nm can be obtained. The resolution requirement for typical displays such as TV screens and computer monitors is relatively modest as human eye can not handle an image resolution finer than ~100 micrometers. For display devices that human will see at a much closer distance, for example, head-mounted displays or wearable personal computing devices, a much higher resolution on the order of ~3 micrometers is required. These headmounted displays allow the use of one's hands freely, and are thus useful for a number of unique applications such as a wearable computer that can be operated while walking, a headmounted gear for a soldier detecting land mines, for a person going through a virtual reality traveling in a car, or for a surgeon undertaking a remote operation through telecom-connected virtual reality devices.

The fabrication of display devices having ~3 micrometer display pixel cell dimension, as compared to the present day display cell size of ~100 micrometers, will be significantly more complex and expensive. In this invention, such a high resolution display is made possible by a novel approach of MEMS based e-beam steering or electrostatically controlled e-beam steering, without having to substantially reduce the cell size.

7. Two Dimensional X-Ray Source

Figure 18:
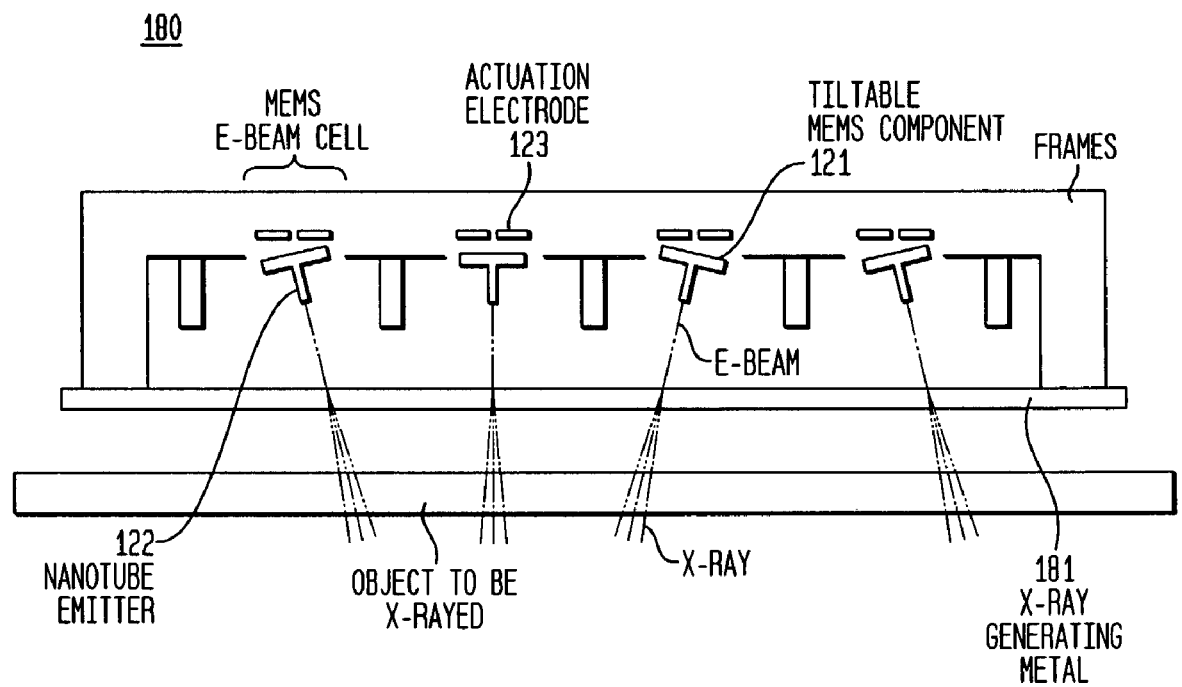
FIG. 18 shows a novel two-dimensional x-ray source.

As illustrated in FIG. 18 the inventive two-dimensional MEMS e-beam source array comprising spaced-apart nanowires can also be utilized as a high-resolution, programmable, two-dimensional x-ray source 180 for applications such as an x-ray lithography tool by incorporating x-ray generating metal film components 181 in front of the emitted electrons, or as a portable, flat-panel, x-ray source for on-site imaging of wounded person by ambulance personnel or battle field medical personnel. The electron bombardment of the metal layer or metal structure from each of the nanotube emitters 122 generates an x-ray beam with a characteristic wavelength.

It is understood that the above-described embodiments are illustrative of only a few of the many possible specific embodiments which can represent applications of the invention. It can be seen that the invention includes a substrate-supported array of spaced apart nanowires comprising a substrate and disposed upon the substrate, a plurality of spaced-apart, aligned nanowires. The ratio of nanowire spacing to nanowire height is at least 0.2, the nanowire diameter is in the range 1–500 nanometers, and the nanowire height is in the range 0.1 to 200 micrometers. It also includes microwave amplifiers, field emission displays, plasma displays and electron beam sources using the array as cathode electron emitters. The beams emitted by the array can be steered individually or collectively. And disposing in the beam path a layer comprising metal for generating x-rays provides a compact x-ray source. Numerous and varied other arrangements can be made by those skilled in the art without departing from the spirit and scope of the invention.

The invention claimed is:

1. A substrate-supported array of spaced-apart nanowires comprising:
   a substrate; and
   disposed upon the substrate a plurality of spaced-apart, aligned and individually steerable nanowires having a ratio of a nanowire spacing to a nanowire height of at least 0.2 and a nanowire diameter in the a range of 1–500 nanometers, wherein the nanowire height is in a range of 0.1 to 200 micrometers, and a ratio of the nanowire height to the nanowire diameter is between approximately 4,500 and 10,000.

2. The array of claim 1 wherein the nanowires are periodically spaced.

3. The array of claim 2 wherein the nanowires are periodically spaced-apart in a hexagonal array.

4. The array of claim 1 wherein the nanowires are carbon nanotubes.

5. The array of claim 1 wherein the spacing to nanowire height ratio is at least 0.5.

6. The array of claim 1 wherein the spacing to nanowire height ratio is at least 1.0.

7. The array of claim 1 wherein the nanowire diameter is in the range 1–50 nanometers.

8. The array of claim 1 wherein the nanowire height is in the range 0.5–50 micrometers.

9. In a microwave amplifier comprising a cathode electron emitter, a grid, an anode, a tail pipe and a collector,
   the improvement wherein the cathode electron emitter comprises an array of substrate-supported, spaced-apart nanowires according to claim 1.

10. In a field emission display comprising a cathode electron emitter, an anode on a transparent substrate, the anode disposed in spaced relation to the emitter, and a phosphor layer disposed between the cathode and the anode,
    the improvement wherein the cathode electron emitter comprises an array of substrate-supported spaced-apart nanowires according to claim 1.

11. In a plasma display device comprising a pair of plates separated by barrier ribs to form a display cell, one plate including a cathode electron emitter and the other including a transparent anode, and a gas disposed within the cell for forming a plasma in response to voltage between the cathode and the anode,
    the improvement wherein the cathode electron emitter comprises an array of substrate-supported, spaced-apart nanowires according to claim 1.

12. In a source of electron beams comprising a plurality of substrate-supported electron emitters disposed on a steerable substrate,
    the improvement wherein the substrate-supported electron emitters disposed on the steerable substrate comprises an array of substrate-supported, spaced-apart nanowires according to claim 1.

13. An x-ray source comprising:
    a source of electron beams according to claim 12; and
    disposed in the path of the electron beams, a layer comprising metal for generating x-rays in response to the electron beams.

14. The source of claim 1 wherein the nanowires are individually steerable and steerable as a group.

15. A flat panel display comprising a cathode electron emitter an anode on a transparent substrate, the anode disposed in spaced relation to the emitter, and a phosphor layer disposed between the cathode and the anode, the improvement wherein the electron emitter comprises an array of substrate-supported, spaced-apart nanowires according to claim 1, the beams from the nanowires being individually steerable.

16. The array of claim 1, wherein each nanowire has a nano-island at its base, the nano-islands are formed using oblique evaporation deposition and a mask having apertures, and a diameter of the nano-islands is less than one-third of a diameter of the apertures of the mask.

17. A source of electron beams comprising:
- a plurality of spaced-apart nanowire field emitter cells, each cell comprising a nanowire cathode emitter, a gate aperture, an anode and an array of substrate-supported nanowires according to claim 1; and
- each cell of the plurality disposed in an array on a substrate.

18. The source of claim 17 wherein the emitters of adjacent cells are spaced-apart by at least one micrometer.

19. The source of claim 17 wherein each emitter is a single nanowire.

20. The source of claim 17 wherein each field emitter cell comprises steering electrodes for steering an electron beam from the emitter.

21. The source of claim 17 wherein the substrate is movable to steer the emitters as a group.

22. The source of claim 17 wherein each field emitter cell is movable to individually steer the emitter.

23. The source of claim 22 wherein each field emitter cell is an individually steerable MEMs cell.

24. The source of claim 23 wherein each field emitter cell is a MEMs cell steerable by electrostatic deflection.

* * * * *